United States Patent [19]

Fisher

[11] 4,192,339

[45] Mar. 11, 1980

[54] VALVE ASSEMBLY

[75] Inventor: John M. Fisher, Cuyahoga Falls, Ohio

[73] Assignee: The B. F. Goodrich Company, Akron, Ohio

[21] Appl. No.: 941,838

[22] Filed: Sep. 11, 1978

[51] Int. Cl.² ............................................. F16K 15/03
[52] U.S. Cl. .................................. 137/223; 137/512.4
[58] Field of Search ................. 137/223, 512, 512.1, 137/512.15, 512.4, 512.5

[56] References Cited

U.S. PATENT DOCUMENTS

| 3,468,472 | 9/1969 | Hahn | 137/223 |
| 3,831,628 | 8/1974 | Kintner | 137/512.15 |
| 3,866,734 | 2/1975 | Elkins | 137/512 X |

Primary Examiner—Robert G. Nilson
Attorney, Agent, or Firm—Harry F. Pepper, Jr.

[57] ABSTRACT

A valve assembly for use in inflating a chamber which comprises two independent subchambers separated by a flexible wall utilizes a single fluid inlet with a valve member controlling communication to the subchambers. The valve member comprises two pivotable portions which move downstream to split the inlet flow to fill each subchamber independently.

7 Claims, 2 Drawing Figures

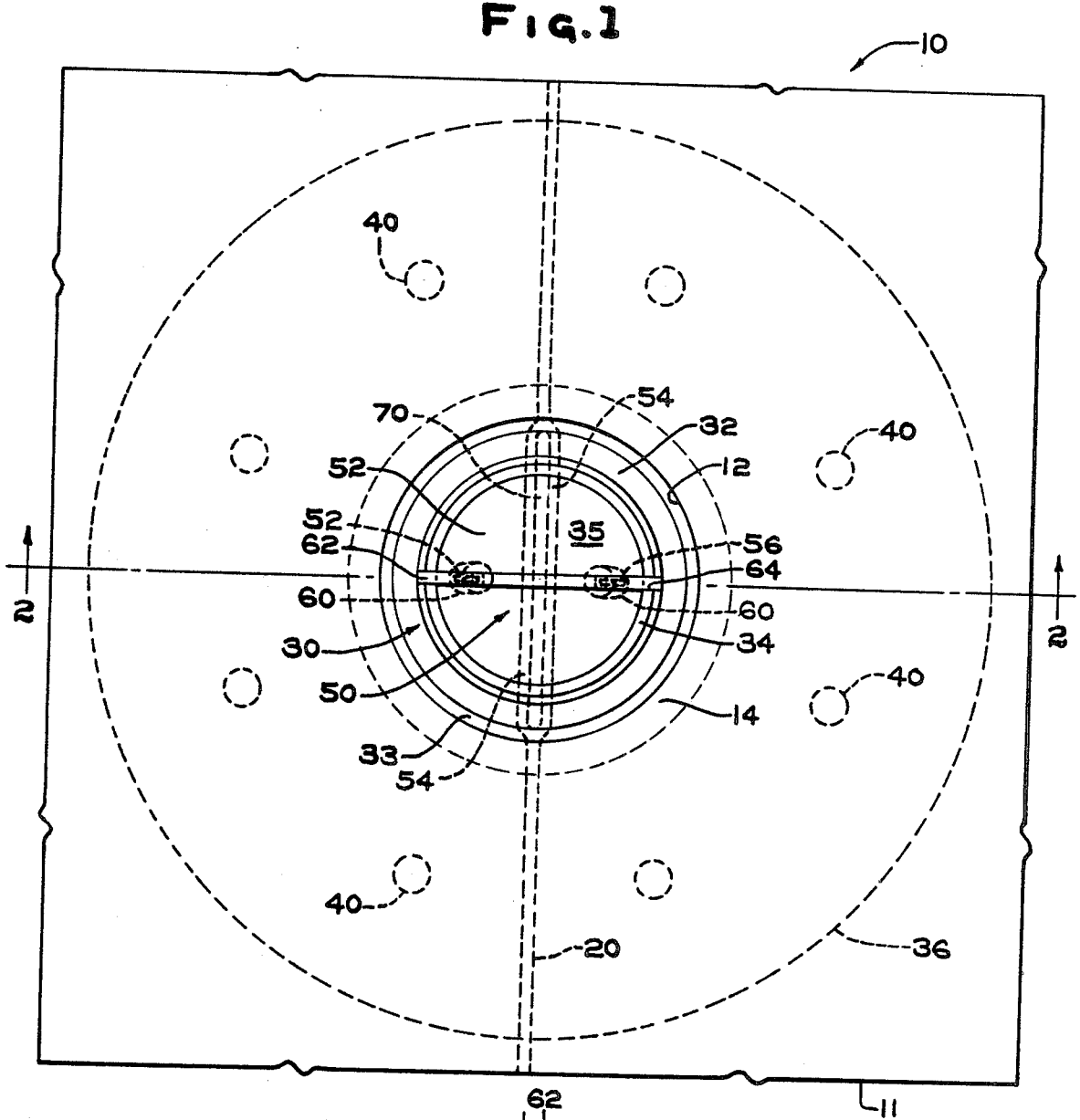
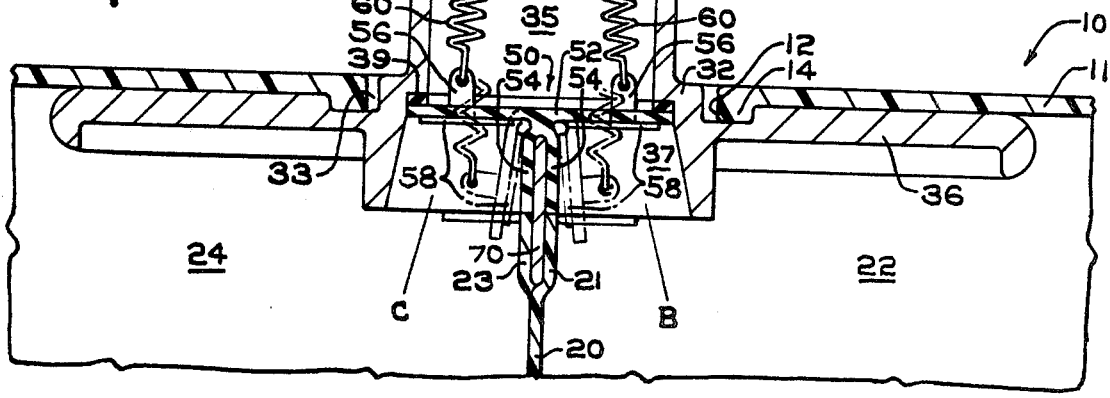

VALVE ASSEMBLY

BACKGROUND

The invention relates to a valve assembly and particularly to a valve assembly for fluid flow into a chamber having a pair of independent subchambers separated by a flexible wall.

Many structural arrangements where fluid is to flow into a fluid chamber utilize valve assemblies to control the inlet to the chamber. A common valve assembly used for this purpose is a check type valve assembly where a valve member is operable to open or close the inlet by movement into and out of engagement with a valve seat in the valve assembly. Usually such a valve member is designed to open by the force of fluid pressure against a biasing force tending to hold the valve member seated or in its closed position.

In inflatable products such as aircraft escape slides, rafts or flotation tubes, gas is used to inflate the product through an inlet into a main inflation chamber defined by the flexible outer walls of the product. Many of these inflatables are currently designed such that the inflation chamber is in reality two fluidly independent subchambers separated internally by a fluid impervious wall sometimes referred to as a "bulkhead". This feature assures that in the event of puncture, tear, etc., at an outer wall portion of the inflatable, complete deflation of the articles will not occur because one or the other of the independent subchambers remains intact and inflated.

To satisfactorily inflate such subchambered structures it is often necessary to provide separate inlets to each subchamber fitted with independent valves so that the subchambers remain fluidly independent. However, spatial requirements and/or other environmental factors render such separate inlets impractical. For example, wheeled helicopters are often fitted with inflatable flotation tubes at the hub portion of each wheel. The limited space allowed for inlet into the inflatable flotation tube dictates a minimization of hoses, tubing, etc., making independent inlets to each of subchamber undesirable.

SUMMARY

The present invention provides a valve assembly particularly adaptable for fluid inlet to a chamber which is divided into fluidly independent subchambers. Specifically, the valve assembly includes a housing, the forward or upstream portion of which is a fluid conduit provided with a valve seat at its rearward or downstream end. The valve housing further includes a downstream flange portion which is attachable to the inlet to the main chamber structure and which flange includes a central opening or bore concentric with the upstream conduit.

Within the housing, disposed between the conduit and flange portions, a valve member is disposed to open and close communication between the fluid conduit portion and the inflation chamber. When closed, this valve member engages the valve seat at the downstream end of the fluid conduit portion. Biasing means such as springs are used to hold the valve member closed. The valve member opens by pivotable movement of a pair of its constituent portions in the downstream direction about a common axis extending substantially parallel to the midplane of the valve member. The flexible wall or bulkhead dividing the independent subchambers is attached to the valve member adjacent this common axis effecting a splitting of the fluid flow into the respective subchambers on either side of the bulkhead.

Thus, the valve assembly according to this invention effects independent inflation of subchambers through a valve housing having a single conduit inlet into the such housing.

THE DRAWINGS

In the drawings which are part of this specification:

FIG. 1 is a plan view of a valve assembly according to the present invention; and FIG. 2 is a section of the valve assembly shown in FIG. 1, through lines 2—2 thereof.

DETAILED DESCRIPTION

The invention according to a presently preferred embodiment is exemplified in the views of the accompanying drawing wherein like reference characters are used to refer to like structural details throughout the views.

In FIGS. 1 and 2, a portion of a flexible, inflatable article 10, such as a helicopter flotation tube, is shown having an inlet opening 12 defined by a thickened circular flange portion 14 of the the outer wall 11 of article 10. An impervious flexible wall or bulkhead 20 divides a main inflation chamber within outer wall 11 into two (2) fluidly independent subchambers 22 and 24. The article 10 is typically made of rubberized fabric material such as neoprene coated nylon. A valve assembly 30 according to the present invention is shown secured to the inflatable article 10 at the inlet opening 12.

Valve assembly 30 comprises a housing 32 consisting essentially of an upstream generally cylindrical fluid conduit portion 34 and a downstream larger diameter annular flange portion 36. Conduit portion 34 contains a gas flow inlet passage 35 therethrough while flange portion 36 also contains a fluid passage 37 which is an extension of and is concentric with passage 35. The upstream side of flange portion 36 contains an annular recess 33 at a radially inward location thereof wherein the thickedned circular flange 14 defining inlet opening 12 into article 10 is disposed to position valve assembly 30 relative to the article 10. An annular series of openings 40 through flange portion are provided to mount the valve assembly, as for example within a helicopter wheel hub, by adequate securing means such as bolts (not shown). When securing the assembly by bolts through openings 40, the bolts also pass through adjacent portions of the outer wall 11 of inflatable 10 thereby serving to secure the inflatable between the flange portion 36 and the structure to which the flange is bolted.

Fluid communication between inlet conduit 34 and the inside of inflatable 10 is controlled by a valve member 50 disposed within valve housing 32. Valve member 50 is shown in FIG. 2 is closed position by solid lines and in open position by broken lines.

Valve member 50 is preferably a molded elastomeric member comprising a circular disc-like closure portion 52 of sufficient diameter to close off passage 35. The annular edge of disc-like portion 52 is shown adapted to seat against the downstream annular edge 38 of conduit 34. An O-ring 39 is positioned along edge 38 to provide an adequate seal. Valve member 50 also comprises a pair of parallel extensions 54 integral with and extending downstream from the downstream side of disc-like closure portion 52. Extensions 54 traverse the disc-like closure 52 diametrically and are preferably of greater width than the diameter of closure portion 52.

The upstream surface of closure portion 52 has a pair of attachment lugs 56 affixed thereto. The downstream surface of closure 52 has a pair of semi-circular, thin rigid plates 58 affixed thereto. These plates 58 serve to stiffen the elastomeric closure portion 52 against back pressure from subchambers 22 and 24 in inflatable 10.

A pair of springs 60 are positioned within inlet passage 35 such that one end of each spring is secured to one of the pair of attachment lugs 56. The other end of each spring 60 is secured to a bar 62 spanning passage 35 and held in position by its ends being disposed within diametrically opposed notches 64 at the upstream end of conduit portion 34.

A pivot bar member 70 having a length substantially equal to the width of valve member extensions 54 spans extension passage 37 of flange portion 36. Each extension 54 of valve member 50 is adhered to bar 70 so as to coextend with opposite sides of bar 70 for about half of its width. Bar 70 is held secure by means of suitable securing means (not shown) connecting the ends of the bar 70 to the flange portion 36 of valve housing 32.

The edge 21 of flexible wall 20 is adhered to one side of bar 70 with the end of such edge abutting the end of one of the valve member extensions 54. On the opposite side of the bar 70 a sheet or tape 23 of the same material as bulkhead 20 is adhered to bar 70 and joins to wall 20 downstream of the downstream edge of bar 70. In this manner, it is noted that bulkhead 20 separating independent subchambers 22 and 24 connects directly to valve member 50 through bar 70.

In operation, fluid, such as pressurized gas, from a source (not shown) enters the valve assembly 30 in the direction of arrow A and applies force against the upstream surface of closure portion 52 of valve member 50 and the valve member 50 opens by semi-circular portions of closure 52 pivoting about bar 70 against the bias forces of springs 60. The fluid flow is then split into each subchamber 22 and 24 as indicated by arrows B and C respectively. When each subchamber fills, back pressure will move the semi-circular portions of valve member back to their closed position with assistance by forces applied by springs 60.

It is evident that variations and departures may be made from the structure described herein, without the same falling outside the scope of the present invention measured by the attached claims.

I claim:

1. A valve assembly at the inlet to a fluid chamber which chamber comprises a pair of fluidly independent subchambers separated by a flexible impervious wall member, said assembly comprising:
(A) a valve housing including
   (1) an upstream fluid conduit portion having a valve seat adjacent its downstream end, and (2) a downstream annular flange portion having a central opening coaxial with said conduit portion and means to secure said housing at said inlet; and
(B) a valve member disposed within said housing between said conduit portion and said flange portion, said valve member comprising a pair of movable portions pivotable about a common axis each of said movable portions communicating said conduit portion with one of said subchambers.

2. The valve assembly as defined as claim 1 wherein said pair of movable valve member portions are adapted to pivot
   (1) downstream toward one another to an open position and (2) upstream away from one another to a closed position engaging said valve seat.

3. The valve assembly defined in claim 2 further comprising:
(C) means biasing said pair of movable valve member portions to said closed position.

4. The valve assembly defined in claim 3 further comprising
(D) means securing said flexible wall to the downstream side of said valve member adjacent said common axis.

5. The valve assembly defined in claim 1 further comprising
(C) means biasing said pair of movable valve member portions to a closed position.

6. The valve assembly defined in claim 5 further comprising
(D) means securing said flexible wall to the downstream side of said valve member adjacent said common axis.

7. The valve assembly defined in claim 1 further comprising
(C) means securing said flexible wall to the downstream side of said valve member adjacent said common axis.

* * * * *